United States Patent [19]

Herz et al.

[11] 3,818,371

[45] June 18, 1974

[54] LASER CONTAINING AN ORGANIC DYE LASING COMPOSITION

[75] Inventors: Arthur H. Herz; William C. McGolgin; John S. Hayward; Otis G. Peterson, all of Rochester, N.Y.

[73] Assignee: Eastman Kodak Company, Rochester, N.Y.

[22] Filed: Oct. 18, 1971

[21] Appl. No.: 190,335

Related U.S. Application Data

[63] Continuation of Ser. No. 29,027, March 30, 1970, abandoned.

[52] U.S. Cl..................... 331/94.5 L, 252/301.2 R
[51] Int. Cl........................... H01s 3/14, C09k 1/02
[58] Field of Search.......... 252/301.2 R; 331/94.5 L

[56] References Cited
UNITED STATES PATENTS

| | | | |
|---|---|---|---|
| 3,500,230 | 3/1970 | Kafalas | 331/94.5 |
| 3,521,187 | 7/1970 | Smavely | 331/94.5 |

OTHER PUBLICATIONS

Peterson et al., "Applied Physics Letters", Vol. 17, No. 6, p. 245–247, September, 1970.

*Primary Examiner*—Edward J. Meros
*Assistant Examiner*—J. Cooper
*Attorney, Agent, or Firm*—Dennis M. DeLeo

[57] ABSTRACT

A laser containing an aqueous dye lasing solution is disclosed wherein the dye solution contains a disaggregating compound which provides enhancement of the lasing output.

9 Claims, No Drawings

LASER CONTAINING AN ORGANIC DYE LASING COMPOSITION

This is a continuation of application Ser. No. 24,027, filed Mar. 30, 1970, now abandoned.

This invention relates to laser systems and more particularly to laser systems using solutions containing organic dyes as lasing media.

Lasers (acronym for light amplification by stimulated emission radiation) or optical masers (acronym for microwave amplification by stimulated emission radiation) are light amplifying devices which produce high intensity pulses of coherent monochromatic light concentrated in a well collimated beam commonly called a laser beam. The laser beam has found wide application in photography, communications, industrial measuring instruments and the like.

Various materials have been used as lasing media. A promising field has been opened in the lasing of organic dye solutions. Some of the recent work in this field is described by P. Sorokin, et al in *Journal of Chemical Physics*, Vol. 48, No. 10, 15 May 1968 and *Scientific American*, Feb. 1969, pg. 220 et seq, and B. B. Snavely, *Proceedings of the IEEE*, 57, 1374, 1969.

For many dye laser applications it is desirable to produce continuous laser beams or beams having a high frequency of output pulses. The high power input required for such purposes tends to produce undesirable effects in organic solutions of organic dyes. For example, high power inputs tend to produce temperature gradients in organic solvents which can produce optical inhomogenities. These phenomenon can substantially decrease lasing efficiency.

A potential solution to the problems produced by high frequency excitations is the use of water as a dye solvent. The use of water has been frustrated due to the fact that many organic dyes which lase in mediums such as alcohol were either drastically decreased in lasing efficiency in aqueous solutions or quenched altogether.

Since the refractive index of water changes relatively little with temperature the search for ways of using this solvent has persisted with the herein described invention as a result. According to this invention it has been learned that the presence of certain additives in relatively low concentrations in aqueous solutions of organic dyes has significantly enhanced their lasing efficiency.

In particular, this invention relates to the use of low concentrations of various additives which function to prevent dye aggregation. The additives useful in the present invention include: I) hydrogen bond accepting organic solutes typically in the concentration range of 0.1 to 10.0 moles per liter of aqueous dyes solution. Typical hydrogen bond acceptors include: alcohols, ethers and polyethers such as tetrahydrofuran and dioxane, phenols and the like; carbonyl compounds such as esters, ketones and amides (including urea and urea derivatives such as guanidine salts, for example guanidine thiocyanate as well as heterocyclic analogs thereof such as 4-hydroxy, 6-methyl 1,3,3a, 7-tetraazaindene); monoxides of group V and VI elements such as phosphineoxides, amine oxides, and sulfoxides, and II) both ionic or non-ionic surface active compounds in concentrations near or above their critical micelle concentrations, typically in the range of from about 0.0005 to 0.1 moles per liter of dye solution. The following groups of surfactants are representative of compounds contemplated in II.

Anionic Surfactants, i.e., compounds which dissociate in water to form a negatively charged organic species that can form micelles, such as compounds having the general formulae $RA^\ominus \ M^\oplus$, where $A^\ominus$ represents an acid group; for example carboxylate, sulfate, sulphonate, and the like, that is covalently bonded to R; and R is a hydrocarbon residue containing at least 8 carbon atoms; and $M^\oplus$ can be hydrogen or an organic or an inorganic cation. Included in the foregoing general formulae are compounds represented by the formulae $R-CO_2^\ominus \ M^\oplus$, and

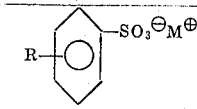

wherein R and M are the same as hereinbefore described.

Cationic Surfactants, i.e., compounds which dissociate in water to form positively charged organic specie that can form micelles, such compounds having the general formula $RB^\oplus \ X^\ominus$ wherein $B^\oplus$ represents a tetravalent Group V element, for example nitrogen, phosphorous and the like; or a trivalent Group VI element, for example oxygen, sulfur, and the like, which is covalently bonded to an R which is as hereinbefore described, and $X^\ominus$ is an organic or an inorganic anion. Further, compounds having the following formulae are included

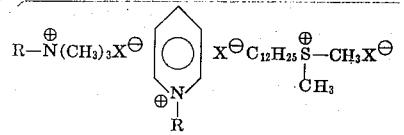

where R and X are the same as hereinbefore described.

Zwitterionic Surfactants, i.e., compounds which dissociate in water to micelle-forming species that contain equal numbers of positive and negative charges and have the general formula: $^\ominus ARB^\oplus$ where $A^\ominus$ and R are the same as hereinbefore described. Included in the foregoing general formulae are compounds represented by the formula

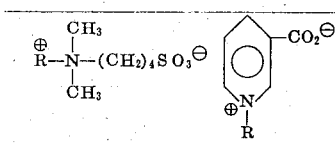

where R is the same as hereinbefore described. Non-Ionic Surfactants, i.e., compounds having the formulae

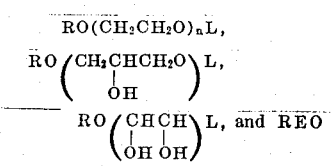

wherein R is the same as hereinbefore described, L is a hydrocarbon residue and $n$ is an average number between 1 and 100, and where EO represents a monoxide where E is a combined trivalent Group V element, such as nitrogen, phosphorous, and the like or a combined divalent Group VI element other than oxygen, such as sulfur, selenium and the like, which are covalently bonded to R. Compounds included herein include polyalkylene oxides, glucosides, glycerylethers and monoxides, such as R—PO—CH$_3$; R—NO—CH$_3$; R—SO—CH$_3$ and R—SO—CH$_2$CH$_2$OH. R is the same as hereinbefore described and L represents a hydrogen atom or a hydrocarbon residue.

Further functional groups which are useful as hydrogen bond acceptors in the hereinbefore described Group I compounds are disclosed by T. Gramstad (Spectrochim. Acta, 19, 829–834, 497–508, 1963). Likewise, further surfactants useful in Group II are described in "Colloidal Surfactants," K. Shinoda et al., Academic Press, New York, 1963 and "Solvent Properties of Surfactant Solutions," K. Shinoda, Marcel Dekker, Inc. New York, 1967.

The dyes which are useful with the present invention will include most organic dyes capable of lasing and may extend to dyes which have not yet shown an ability to lase in organic solvent media. It is also expected that lasing dyes will be useful in aqueous solution independent of their ionic charge in solution. It is contemplated that useful dyes will include triphenylmethane derivatives, phthaleins, azines, cyanines, and pyrilium dyes as well as their sulfur and nitrogen analogs.

The invention is further described by the following example.

EXAMPLE 1

The test apparatus consisted of a Sorokin-type coaxial flashlamp around a lasing cavity for optical excitation of the solutions containing Rhodamine 6G as described in U.S. application Ser. No. 668,710, now U.S. Pat. No. 3,521,187 (French Patent No. 1,580,685, issued July 28 1969), with the energy for the lamp stored by a Cornell Dubilier luf. fast discharge capacitor. The solutions were tested in 250 ml. quantities and were circulated through the laser cavity by means of a pump while the tests were made. Thresholds recorded are the minimum voltages on the capacitor required to initiate lasing. These thresholds are:

| | Voltage | Energy($=\tfrac{1}{2}CV^2$) |
|---|---|---|
| $10^{-4}$M R6G in Ethanol | 9 KV | 40.5 joules |
| $10^{-4}$M R6G in H$_2$O | 13.25–14.25 KV | 88–100 joules |
| $10^{-4}$M R6G in H$_2$O, 2M Urea | 12.5 KV | 78 joules |
| $10^{-4}$M R6G in H$_2$O, 5% (weight Carbowax '4000' * | 11.0 KV | 60.5 joules |
| $10^{-4}$M R6G in H$_2$O, 5% Carbowax '1540' * | 11.0 KV | 60.5 joules |
| $10^{-4}$M R6G in H$_2$O, with 15 ml * Carbowax '600' added | 11.5 KV | 66 joules |
| $10^{-4}$M R6G in H$_2$O, 4% Oleyl Ester of Polyethylene Oxide | 10.0 KV | 50 joules |

*Trademarks for Union Carbide Co. polyethers.

EXAMPLE 2

Example 1 was followed as described except that the dye was sulfo Rhodamine B and the disaggregating compound was Triton X-100, a trademark of the Rohm & Haas Co. for octyl phenoxy polyethoxy ethanol. $2 \times 10^{-4}$ Molar Dye was used in each case.

| | Voltage | Energy($=\tfrac{1}{2}CV^2$) |
|---|---|---|
| Dye in methanol (250 ml solution) | 10.8KV | 58 joules |
| Dye in water (250 ml solution) | 16.5KV | 136 joules |
| Dye + 0.2% by weight of compound | 14.5KV | 105 joules |
| Dye + 0.4% by weight of compound | 13KV | 85 joules |
| Dye + 0.8% by weight of compound | 11.5KV | 66 joules |
| Dye + 2.0% by weight of compound | 11.5KV | 66 joules |

EXAMPLE 3

Example 1 was repeated as described except that the solution contained a $2 \times 10^{-4}$ Molar concentration of sulfo Rhodamine B dye and the disaggregating compound was sodium lauryl sulfate.

| | Voltage | Energy($=\tfrac{1}{2}CV^2$) |
|---|---|---|
| Dye in water (250 ml) | 17.5KV | 153 joules |
| Dye + 1.3g. of compound | 17.5KV | 153 joules |
| Dye + 2.5g. of compound | 17.1 to 17.2KV | 147 joules |
| Dye + 3.0g. with slow mixing to avoid cloudiness | 15KV | 112 joules |

EXAMPLE 4

Example 1 was repeated as described except that the dye was sulfo Rhodamine B ($2 \times 10^{-4}$ Molar concentration) and the disaggregating compound was dodecyl dimethylamine oxide.

| | Voltage | Energy($=\tfrac{1}{2}CV^2$) |
|---|---|---|
| Dye in water (250 ml) | 18.4KV | 169 joules |
| Dye + 1.1g of compound | 11.2KV | 63 joules |
| Dye + 2.3g of compound | 11.0KV | 60 joules |

EXAMPLE 5

Example 1 was repeated as described except that the dye was sulfo Rhodamine B ($2 \times 10^{-4}$ Molar concentration) and the disaggregating compound was 4-Hydroxy-6-methyl-1,3,3a,7-tetraazaindene sodium salt.

| | Voltage | Energy(=½CV²) |
|---|---|---|
| Dye in water (250 ml) | 19.2KV | 184 joules |
| Dye + 0.5g of compound | 17.0KV | 139 joules |
| Dye + 1.0g of compound | 15.5KV | 120 joules |
| Dye + 2.5g of compound | 13.5KV | 91 joules |
| Dye + 5.0g of compound | 12.0KV | 72 joules |

EXAMPLE 6

Example 1 was repeated as described except that the dye was sulfo Rhodamine B ($2 \times 10^{-4}$ Molar concentration) and the disaggregating compound was hexadecyltrimethyl ammonium chloride.

| | Voltage | Energy(=½CV²) |
|---|---|---|
| Dye in water (250 ml) | 19KV | 180 joules |
| Dye + 0.375g of compound | 20KV | 200 joules |
| Dye + 0.75g of compound | 13.5 KV | 91 joules |
| Dye + 1.5g of compound | 12.2 KV | 74 joules |
| Dye + 3.75g of compound | 12.2 KV | 74 joules |

EXAMPLE 7

Example 1 was repeated as described except that the dye was sulfo Rhodamine B ($2 \times 10^{-4}$ Molar concentration) and the disaggregating compound was 1,4,4-trimethyl-4-azoniahexadecane-1-sulfonate.

| | Voltage | Energy(=½CV²) |
|---|---|---|
| Dye in water (250 ml) | 19.5KV | 190 joules |
| Dye + 0.25g of compound | 19 KV | 180 joules |
| Dye + 0.40g of compound | 16KV | 128 joules |
| Dye + 1.25g of compound | 12.5KV | 78 joules |
| Dye + 2.50g of compound | 12KV | 72 joules |
| Dye + 5.0g of compound | 11.5 KV | 66 joules |

EXAMPLE 8

1,1'-Diethyl, oxadicarbocyanine iodide (DODC) was tested to determine the effect of a disaggregating compound on the lasing threshold and efficiency of the dye. The dye was optically excited with 5,300 A light from a frequency doubled Nd-Glass laser. Pumping was done in a longitudinal configuration; that is, the pump light was passed through one of the dye laser mirrors into the dye curvette along the optical axis of the dye laser cavity formed by the two dielectric mirrors and the dye curvette containing the DODC. An attenuator was used to vary the input energy to the dye curvette.

The pump light input energy was measured as well as the output energy of the laser light produced by the dye.

| | | Joules Input | Output Energy |
|---|---|---|---|
| $6 \times 10^{-6}$ | M Dye in water | $3.085 \times 10^{-2}$ | Didn't lase |
| Dye + 1% | by volume of Triton X-100 | $.078 \times 10^{-2}$ | $.0116 \times 10^{-3}$ |
| Dye + 1% | by volume of Triton X-100 | $.812 \times 10^{-2}$ | $.977 \times 10^{-3}$ |
| Dye + 1% | by volume of Triton X-100 | $1.11 \times 10^{-2}$ | $1.41 \times 10^{-3}$ |

The invention has been described in detail with particular reference to preferred embodiments thereof, but it will be understood that variations and modifications can be effected within the spirit and scope of the invention.

We claim:

1. In a dye laser having a laser cavity containing a laser dye solution and an excitation means operably coupled therewith and capable of producing stimulated emission of the laser dye solution, the improvement wherein said laser dye solution consists essentially of a lasing concentration of an aqueous-aggregating organic lasing dye in an aqueous solvent containing a disaggregating compound selected from the group consisting of (a) an organic hydrogen bond acceptor compound selected from the group consisting of an alcohol, a phenol, an ether, a carbonyl compound, a guanidine salt, a heterocyclic amide and an organic monoxide of a Group V or Group VI element and (b) an ionic or a non-ionic organic surfactant capable of forming micelles in aqueous solution, said surfactant being selected from the group consisting of: anionic surfactants having the formula $RA^{\ominus} \ M^{\oplus}$;
cationic surfactants having the formula $RB^{\oplus} \ X^{\ominus}$;
zwitterionic surfactants having the formula $^{\ominus}ARB^{\oplus}$; and
non-ionic surfactants having a formula selected from the group of general formulas consisting of:

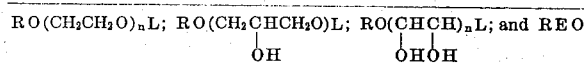

$$RO(CH_2CH_2O)_nL; \quad RO(CH_2CHCH_2O)L; \quad RO(CHCH)_nL; \text{ and } REO$$
$$\phantom{RO(CH_2CH_2O)_nL; \quad RO(CH_2CH}\underset{OH}{|} \phantom{HO)L; \quad RO(C}\underset{OH}{|}\underset{OH}{|}$$

wherein R is a hydrocarbon residue containing at least eight carbon atoms; $A^{\ominus}$ is an acid group covalently bonded to R; $M^{\oplus}$ is hydrogen or an organic or an inorganic cation; $B^{\oplus}$ is the cation of a tetravalent Group V element or a trivalent Group VI element; EO is a monoxide where E is a combined trivalent Group V element or a combined divalent Group VI element other than oxygen covalently bonded to R; $X^{\ominus}$ is an organic or an inorganic anion; L is a hydrogen atom or a hydrocarbon residue and n is a number between 1 and 100, and said compounds (a) or (b) being present in an amount of 0.1 to 10 moles per liter of dye solution or 0.0005 to 0.1 mole per liter of dye solution, respectively.

2. The dye laser as described in claim 1 wherein the guanidine salt is guanidine thiocyanate.

3. The dye laser as described in claim 1 wherein the carbonyl compound is 4-hydroxy-6-methyl-1,3,3a,7-tetraazaindene.

4. The dye laser as described in claim 1 wherein the monoxide compound is selected from the group con- 5. In a dye laser having (a) a lasing cavity containing a laser dye solution and (b) an excitation means operably coupled therewith and capable of producing stimulated emission of the laser dye solution, the improvement wherein said laser dye solution consists essentially of a lasing concentration of an aqueous-aggregating organic lasing dye in an aqueous solvent containing a disaggregating compound present in a concentration range of from about 0.0005 to about 0.1 mole per liter and selected from the group consisting of:

anionic surfactants having the formula $RA^{\ominus} \ M^{\oplus}$;
cationic surfactants having the formula $RB^{\oplus} \ X^{\ominus}$;
zwitterionic surfactants having the formula $^{\ominus}ARB^{\oplus}$; and non-ionic surfactants having a formula selected from the group of general formulas consisting of:

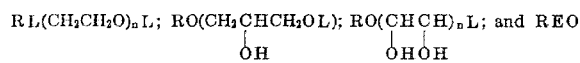

wherein R is a hydrocarbon residue containing at least eight carbon atoms; $A^{\ominus}$ is an acid group covalently bonded to R, $M^{\oplus}$ is hydrogen or an organic or an inorganic cation; $B^{\oplus}$ is the cation of a tetravalent Group V element or a trivalent Group VI element; EO is a monoxide where E is a combined trivalent Group V element or a combined divalent Group VI element other than oxygen covalently bonded to R; $X^{\ominus}$ is an organic or an inorganic anion; L is a hydrogen atom or a hydrocarbon residue and $n$ is a number between 1 and 100.

6. The dye laser as described in claim 5 wherein the anionic surfactant has a general formula of $R-CO_2O^{\ominus}M^{\oplus}$ or

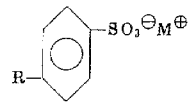

7. The dye laser as described in claim 5 wherein the cationic surfactant has a general formula $R-N^{\oplus}(CH_3)_3X^{\ominus}$,

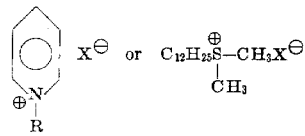

8. The dye laser as described in claim 5 wherein the zwitterionic surfactant has a general formula:

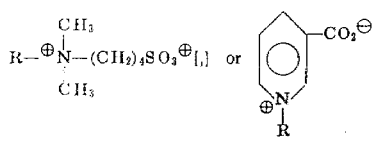

9. The dye laser as described in claim 5 wherein the non-ionic surfactant is selected from the group consisting of polyalkylene oxides having the formula $RO(CH_2CH_2O)L$; glucosides; glyceryl ethers having the formula $ROCH_2-CHOH-CH_2OH$; monoxides of Group V and VI elements having the formulae $R-PO-CH_3$, $R-SO-CH_3-$ or $R-SO-CH_2CH_2OH$.

* * * * *